United States Patent [19]
Adler et al.

[11] 4,069,675
[45] Jan. 24, 1978

[54] METHOD OF OPTIMIZING THE PERFORMANCE OF A MULTI-UNIT POWER

[75] Inventors: Louis S. Adler, San Jose; S. Keith Swanson, Saratoga, both of Calif.

[73] Assignee: Measurex Corporation, Cupertino, Calif.

[21] Appl. No.: 667,347

[22] Filed: Mar. 16, 1976

[51] Int. Cl.² .............................................. F01K 13/02
[52] U.S. Cl. ...................................... 60/667; 60/676; 122/448 R; 122/448 B
[58] Field of Search ......................... 60/648, 660–667, 60/676; 235/151.21; 122/448 R, 448 B

[56] References Cited

U.S. PATENT DOCUMENTS

| | | | |
|---|---|---|---|
| 3,908,897 | 9/1975 | van Holtz et al. | 122/448 X |
| 3,942,327 | 3/1976 | Noe | 60/665 |

Primary Examiner—Allen M. Ostrager
Attorney, Agent, or Firm—Flehr, Hohbach, Test, Albritton & Herbert

[57] ABSTRACT

A method of optimizing the performance of a multi-unit power plant which produces both electrical and steam energy by determining the incremental efficiency of power boilers with various fuel inputs and thereafter determining the index of performance by taking into account cost factors and reallocating in the most optimum manner.

4 Claims, 9 Drawing Figures

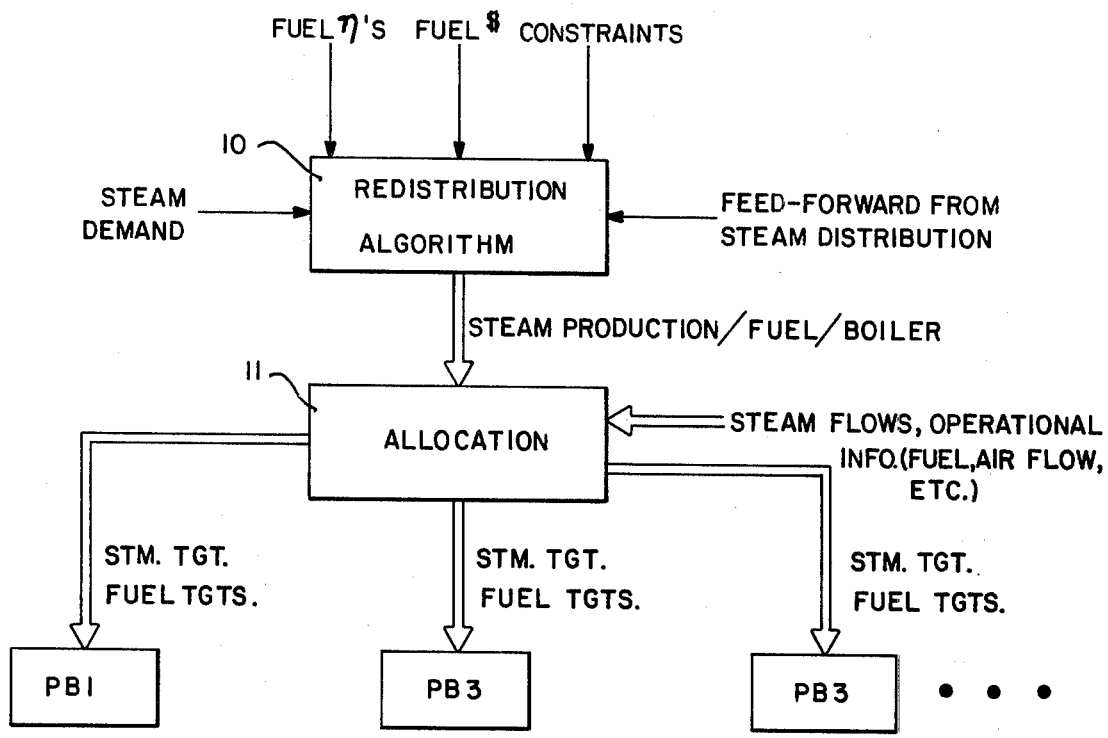
FIG.—1
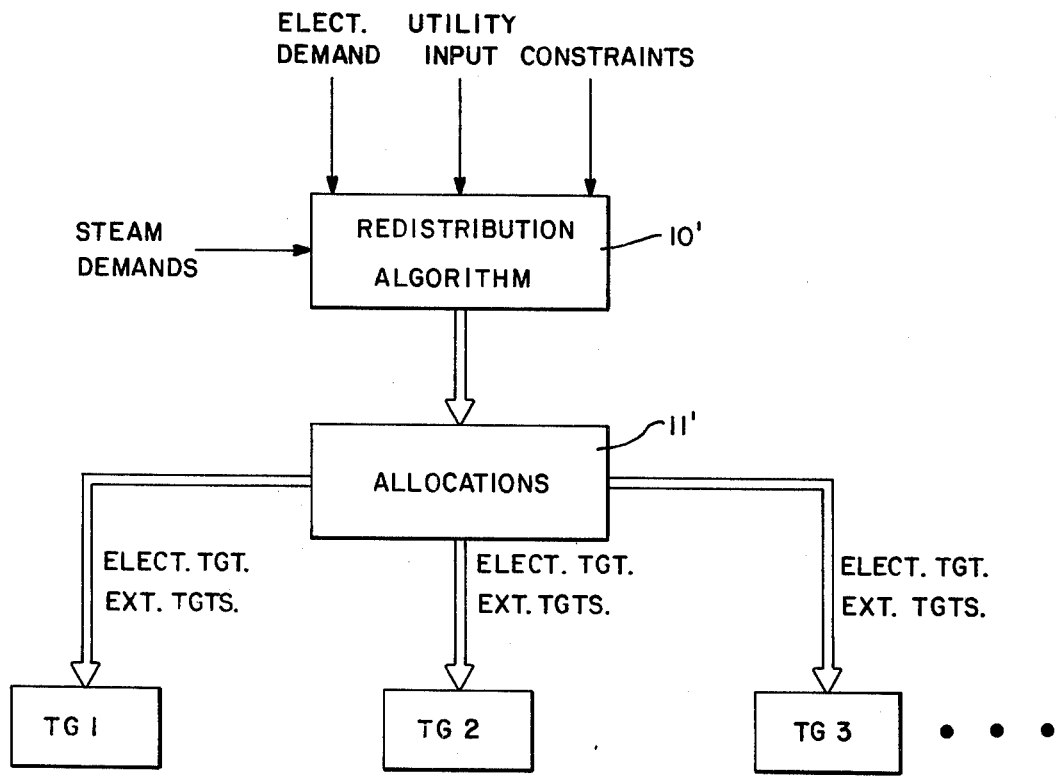
FIG.—2

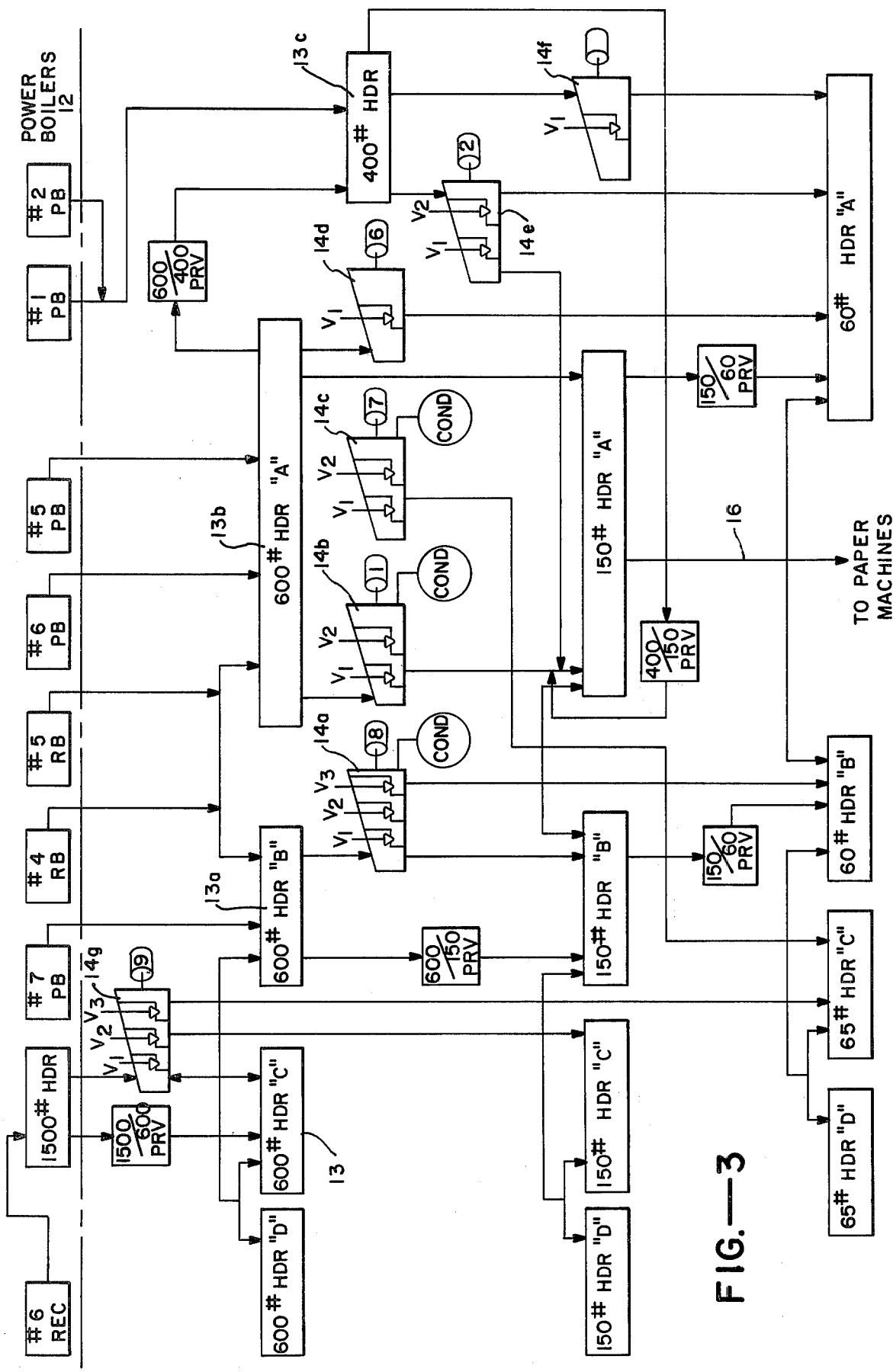
FIG.—3

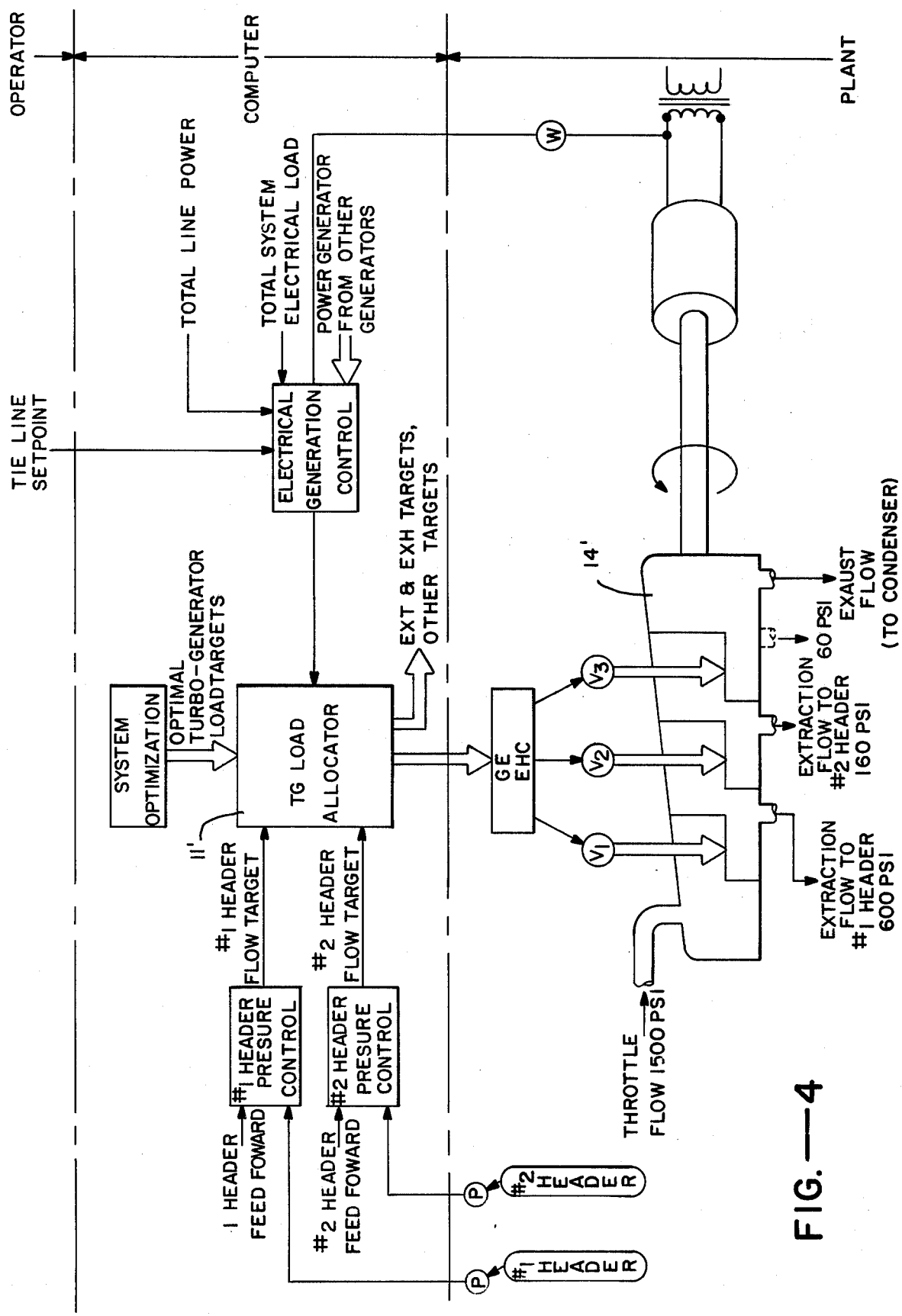
FIG.—4

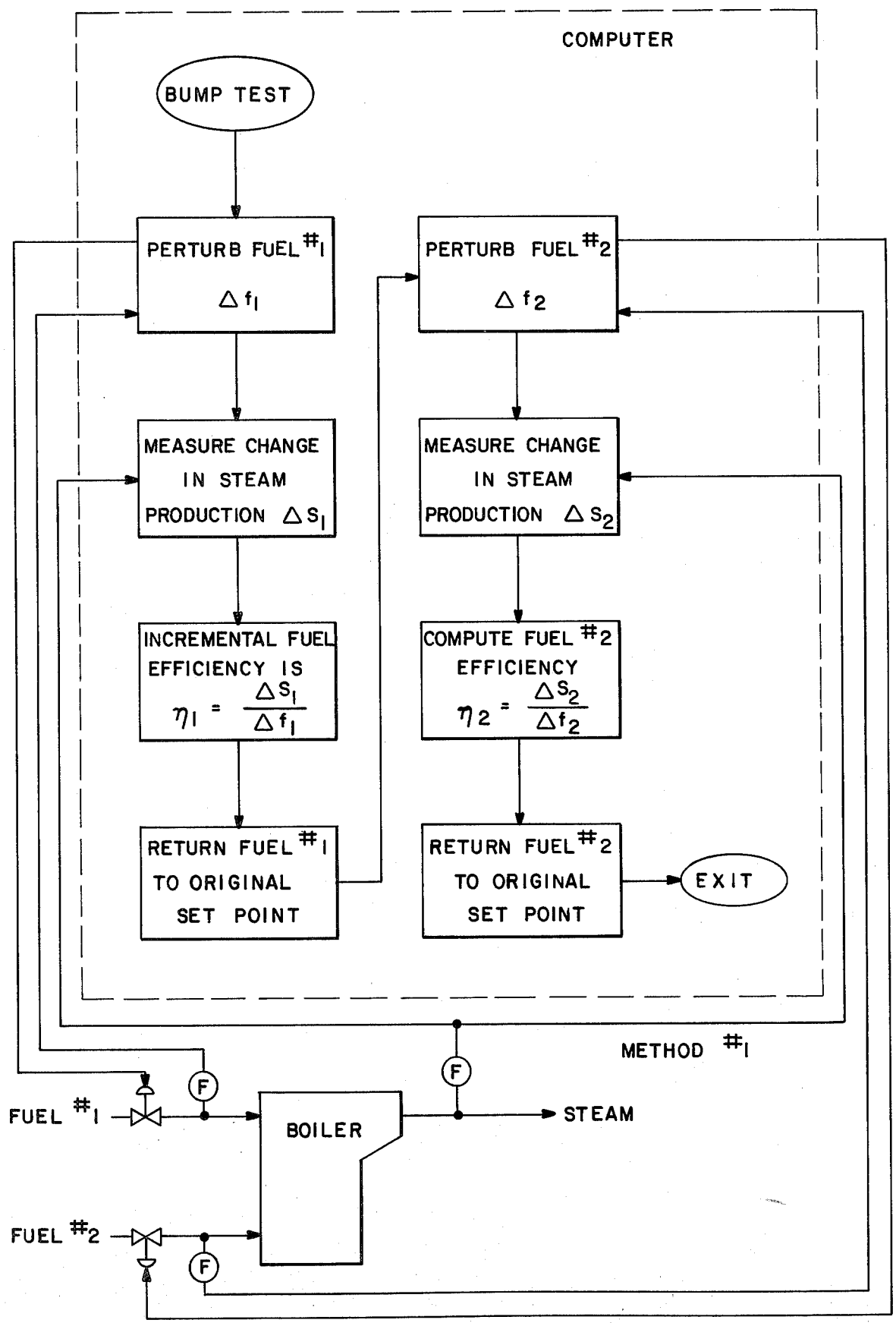
FIG.—5

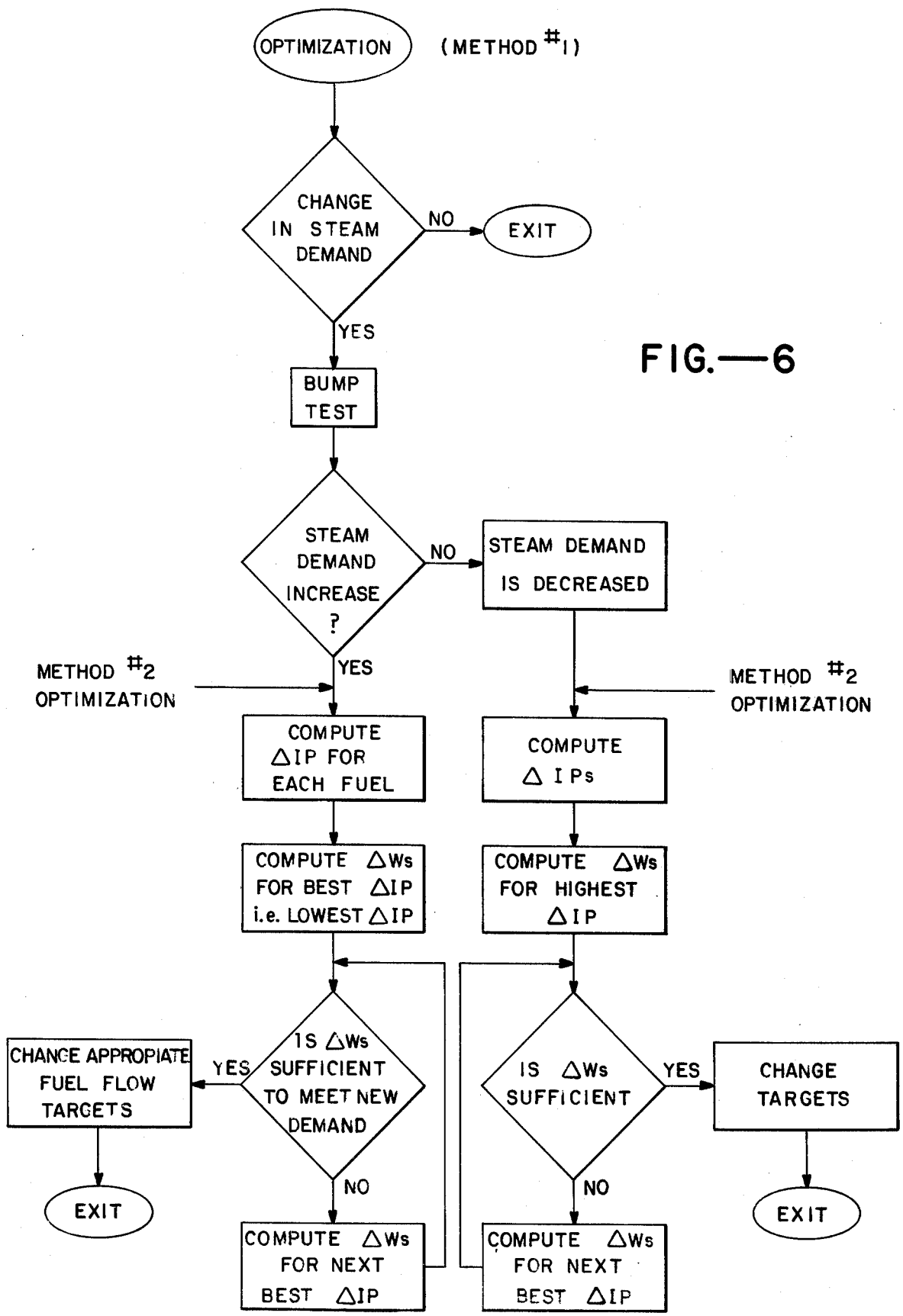
FIG.—6

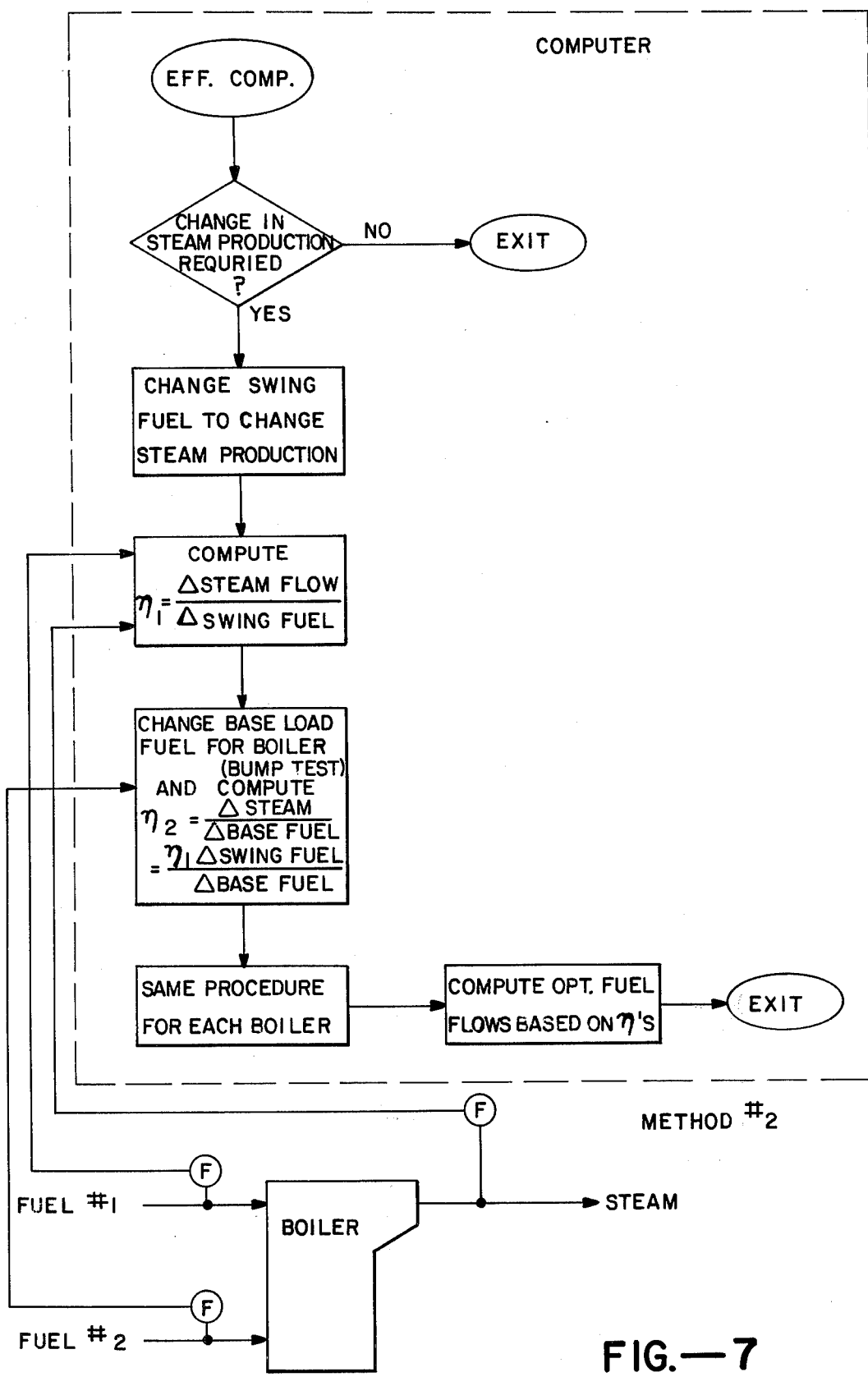
FIG.—7

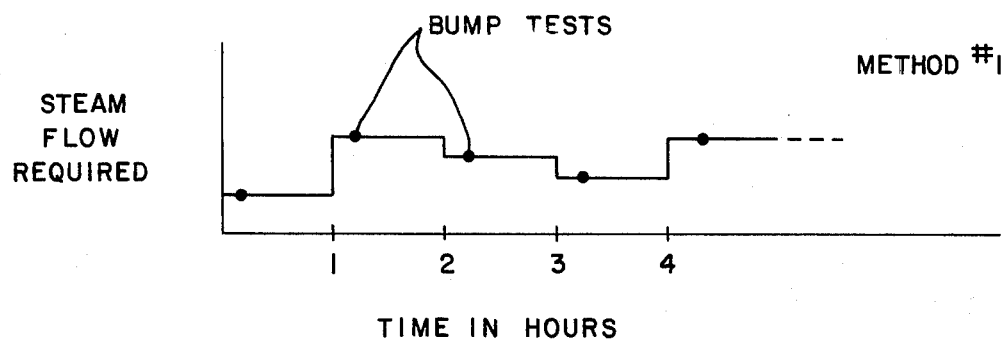
FIG.—8
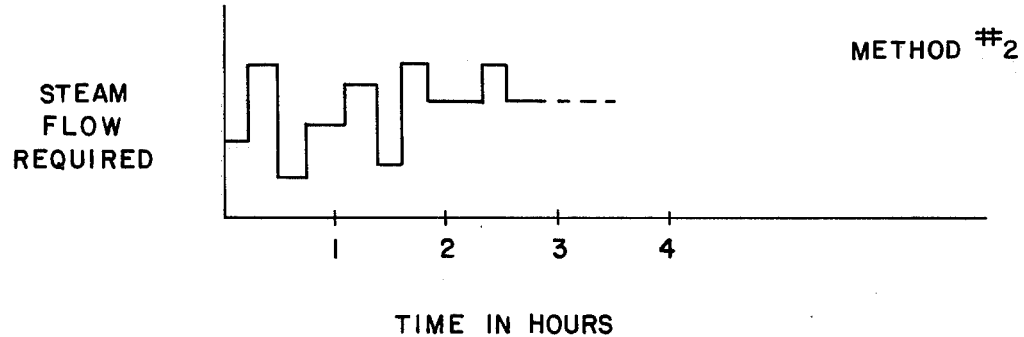
FIG.—9

METHOD OF OPTIMIZING THE PERFORMANCE OF A MULTI-UNIT POWER

BACKGROUND OF THE INVENTION

The present invention is directed to a method of optimizing the performance of a multi-unit power plant and more specifically for the integrated control of the power boiler and steam distribution (including turbine generator) system in the pulp and paper industry.

In the pulp and paper industry and for that matter in any petro-chemical industry in-house multi-unit power plants are used both to generate electrical energy and steam which is used as part of the processing operation; for example, in a paper mill in the paper industry. The steam energy is a significant fraction of the total energy produced by the power plant. Moreover, this steam energy is used for purposes independent of generation of electrical power.

This is in contrast to a typical power industry system where all steam from the turbine generator is returned via condensate to the power boiler for reheating along with make-up water. In the paper industry, for example, a significant portion of steam is extracted from the turbine generator at pressures of, for example, 600, 160 and 60 pounds per square inch and used to provide steam energy to many different types of production units, for example, paper machines, dryers, evaporators, in the pulp and paper manufacturing process.

Thus, it is apparent that the control criteria for energy optimization in the typical power industry systems are inadequate in the paper industry. Yet another difference especially in the paper industry is the use of wood chips as one of the fuels for the power boiler in addition to both coal and oil. Wood chips because of the change in their moisture and type of wood will vary in their effective heating value. In addition, this heating value may be lessened because of the tendency of the wood chips to form soot in the power boiler to again lower efficiency. Moreover, the perturbations in fuel characteristics and their resulting effect on efficiency cannot be directly and accurately measured. This is especially true in present day electrical power industry control systems.

There are several specific disadvantages in the case of pulp mills with present energy management systems. For example, in power boilers which are fired with two fuels, for example, coal or wood chips as a base load fuel and oil as the swing fuel, the base load fuel is not adjusted for changes in operating conditions. The loading of individual power boilers is based solely on steam production requirements not on operating efficiency. The efficiencies of the various steam turbines are not taken into account when loadings are distributed to the steam engine. Finally, presently available systems are not able to compensate quickly for changes in electrical and steam demands. The result is higher rate charges from the local electrical utility due to exceeding the peak demand level.

OBJECT AND SUMMARY OF THE INVENTION

It is, therefore, a general object of the invention to provide a method of optimizing the performance of a multi-unit power plant and more specifically a power plant which has as significant independent outputs low pressures and medium pressure steam for use in the chemical processing portion of the plant.

In accordance with the above object there is provided a method of optimizing the performance of a multi-unit power plant which produces steam energy from a plurality of different fuels. The steam energy used for different purposes is a significant fraction of the total energy produced by the power plant. Input perturbations to the system affecting its performance cannot be directly and accurately measured. The real time incremental efficiency of the units of the power plant are determined by bump tests. Change in the energy output of the units in response to change in energy input is sensed. The index of performance of the units is determined by utilizing the incremental efficiency determination. The energy outputs of the units are reallocated in accordance with the index of performance.

BRIEF DESCRIPTION OF THE DRAWINGS

FIGS. 1 and 2 are functional diagrams illustrating power boiler and steam distribution system optimization;

FIG. 3 is a block diagram of a multi-unit power plant utilizing the method of the present invention;

FIG. 4 is a generalized control schematic of a typical turbine generator;

FIGS. 5 and 6 are flow charts useful in understanding one embodiment of the invention;

FIG. 7 is a flow chart useful in understanding another embodiment of the invention; and FIGS. 8 and 9 are steam flow diagrams useful in understanding the flow charts of FIGS. 5 and 7, respectively.

DETAILED DESCRIPTION OF THE PREFERRED EMBODIMENTS

FIG. 1 is a functional diagram which illustrates power boiler system optimization. As indicated the inputs to the system are the steam demand which would include low and medium pressure steam for the processing portion of the pulp mill, for example, and also the steam demand of the turbine generator (see FIG. 2) for producing the necessary electrical energy. As discussed above, the prime purpose of the electrical energy is to meet peak demands and thus minimize costs of utility power. Other inputs to the block 10 labeled redistribution algorithm are, fuel efficiency or $\eta$, the cost of fuel which as will be discussed below provides an index of performance, and constraints on the system would include antipollution controls such as the time and duration of the burning of wood chips. Finally, a feed-forward from the steam distribution system of FIG. 2 provides for more level operation. Once the redistribution algorithm is computed and the allocations are actually determined as indicated in box 11 by receiving the actual steam flows and other operational information such as fuel input flows, both steam targets and fuel targets are set for the power boilers of the system designated PB1, PB2, PB3 . . .

The steam distribution system of FIG. 2 is similar in that the redistribution algorithm block 10' has as inputs steam demands, electrical demands, utility input and constraints. One of the constraints here is that peak electrical power requirements of the system are met to minimize utility power costs. Allocation to various turbine generators designated TG1, 2, 3 . . . determines both the electrical output target and the extraction targets which are in effect steam at the various pressures. FIG. 3 illustrates a typical multi-unit power plant which would be used in a paper mill and includes various power boilers 12 designated PB1 through 7 which feed various steam headers 13a through c. These are relatively high pressure, for example, 600 psi. and 400 psi. and primarily provide steam energy to the first turbines indicated 14a through 14f. In addition, there is a high pressure turbine 14g which receives steam from a 1500 psi. header. Low and medium pressure steam is extracted from the various turbine generators to the 150 psi. headers and 60 psi. headers. A typical use of the 150 psi. headers is coupling them directly to a paper machine as indicated on line 16.

A more detailed control schemmatic of a single turbine generator 14' is shown in FIG. 4 where the extraction flows of 600, 160, 60 and essentially zero psi. are indicated. Moreover, a computer performs a typical feedback control. However, in accordance with the invention, a turbine generator load allocator 11' (see FIG. 2) is illustrated which is controlled by the system optimization method of the present invention.

FIG. 5 illustrates an incremental efficiency bump test for a single boiler. The boiler is indicated as having two fuel inputs; for example, oil and coal or wood chips. An input flow valve sets the fuel flow $f_1$ in pounds per hour as measured by the flow meter F and an output flow meter F which measures the steam production in pounds per hour, $S_1$.

As illustrated in FIG. 5, the steps of the test are as follows. To initiate the bump test fuel number one is perturbed a $\Delta f_1$ amount. Specifically, the amount of oil that enters the boiler may be changed by, for example 5%. The resultant change in steam production $S_1$ is measured and the incremental efficiency calculated by taking the ratio of the two amounts. This determines the incremental efficiency for the fuel number one and fuel one is returned to its original set point. Then fuel number two such as coal or wood chips is perturbed. Measurement of change in input energy with the change in energy output is again made for the incremental efficiency of the second fuel. In the case of "method #1" this bump test is ideally made as illustrated in FIG. 8 after each change in steam flow. This may occur on an hour to hour basis.

After computing or determining the incremental efficiencies these are utilized when there is a change in steam demand, to compute the index of performance. In simplified form if steam production is reduced then this is done with the least efficient boiler and an increase in production is with the most efficient boiler. FIG. 6 illustrates the optimization process after fuel efficiencies are computed. Referring specifically to the flow chart of FIG. 6, the question is there a change in steam demand is asked and a "yes" answer starts the process. If there is a steam demand decrease, the right hand portion of the flow chart is used. Where steam demand is decreased the index of performance is computed for each boiler and $\Delta W_s$ steam production in pounds per hour computed for the highest index of performance. If the $\Delta W_s$ of the best boiler is sufficient to meet the decrease, the target is changed and an exit is made. If not, $\Delta W_s$ is computed for the next best index of performance until the demand is met.

Referring to the "yes" output of the steam demand increase block, again the $\Delta IP$ is computed for each fuel and boiler and the $\Delta W_s$ is computed for the best index of performance for the purpose of increasing steam demand. Again in a manner similar to steam decrease, the same steps are made in order to meet the new demand.

As shown in FIG. 8 because of relatively long time and the regularity of the steam flows, there is ample time for bump tests and thus this allows the control algorithms to compute in advance fuel change when a new steam production level is demanded. However, as illustrated in FIG. 9, labeled method #2, if the steam flow demands change frequently the bump test cannot be made in the same manner. Thus, the flow chart of FIG. 7 is utilized when steady state operation is of extremely short duration. In essence what is done here is that changes in steam demand are actually taken with the swing fuel (such as oil) to the boilers and thereafter the base fuel flow is changed to measure its incremental efficiency while cutting back on the swing fuel in order to maintain the same steam output. Referring in detail now to FIG. 7 the efficiency computation is intiated by determining whether a change in steam production is required. If yes, swing fuel is changed to accommodate the new steam production and an incremental efficiency is computed designated $\eta 1$. Thereafter, the base load fuel for the boiler is changed but since steam is maintained constant as indicated the incremental efficiency base load fuel is measured by utilizing the product of the $\Delta$ swing fuel and its efficiency as an indication of the simulated change in steam flow due to change in base fuel. The same procedure is carried out for each boiler of the system. Then fuel flows based on these efficiencies can be computed in the same manner as for method #1 in conjunction with the flow chart of FIG. 6. However, the entry, of course, will not be in response to a steam demand but made independently as indicated by the method #2 optimization entry.

Although applied to a steam distribution system the methods #1 and #2 of FIGS. 5 and 7, respectively can also be applied to a turbine generator. For such a system the efficiency is a ratio of the $\Delta$ megawatt output over the $\Delta$ throttle flow. In other words, a change in the amount of steam extracted from a single stage of a turbine will change the steam power input to the generator. Thus, changes in electrical demand or extraction flow can be met most efficiently by selecting the optimal real time cost changes in flows to the turbine. Again, an incremental real time efficiency computation is desired since unmeasurable perturbations in the turbine generator system such as heat and friction, for example, will cause hour to hour changes in efficiencies. In addition, in a turbine generator the incremental efficiency must also be calculated when the condensate is being varied.

The following example will indicate the methods of the present invention. The case is of two boilers, PB1 and PB2, where boiler 1 has oil as fuel, $f_1$, and boiler also has oil as fuel designated $f_2$. Also let $$\eta_1 = \frac{\text{LB STEAM PRODUCED}}{\frac{\text{LBS OIL}}{PB1}} \qquad (1)$$

$$\eta_2 = \frac{\text{LB STEAM PRODUCED}}{\frac{\text{LBS OIL}}{PB2}} \qquad (2)$$

For this system the objective is to maintain steam demand at a minimum fuel cost.

A simple model for the total steam production of this system is $$W_s = \eta_1 f_1 + \eta_2 f_2 \qquad (3)$$

where
- $W_s$ = Total steam produced (lb/hr)
- $f_1$ = Fuel oil to PB1 (lb/hr)
- $f_2$ = Fuel oil to PB2 (lb/hr)

The index of performance for this system must relate the cost of operation and the value of the product. Thus, $$IP = C_o(f_1 + f_2) - C_s W_s \quad (4)$$

where
- $C_o$ = Cost of fuel oil ($/lb)
- $C_s$ = Cost of purchasing steam externally ($/lb)
- IP = Index of performance ($/hr)

Equation (3) describes the capability of the system to produce steam. For a change in $f_1$ or $f_2$ or both, the model will compute the corresponding change in steam production. As a boiler changes operating points, its efficiency parameter $\eta$ will also change. Thus, $\eta_1$ and $\eta_2$ must be continually updated for equation (3) to be meaningful.

Equation (4) provides information concerning the cost of operation. The first term is obviously the fuel cost. The second term forces the optimization to ensure that boilers produce the amount of steam required by the process.

In order to implement this scheme, it is convenient to use the incremental form of equations (3) and (4):

$$\text{MODEL } W_s = \eta_1 \Delta f_1 + \eta_2 \Delta f_2 \quad (5)$$

$$\text{INDEX } \Delta IP = C_o(\Delta f_1 = \Delta f_2) - C_s \Delta W_s \quad (6)$$

Equation (5) computes the incremental change in steam production for an incremental change in fuel. Equation (6) computes the corresponding change in operating cost.

Given equations (5) and (6), for a required change in steam demand, to which power boiler should fuel be increased or decreased?

Assume for now that it is decided that all load swings will be taken by PB1. Then, since PB2 is being run as a base loaded unit, $$\Delta f_2 = 0$$

all the time. Equations (5) and (6) simplify to $$\Delta W_s = \eta_1 \Delta f_1 \quad (5a)$$

$$\Delta IP_1 = C_o \Delta f_1 - C_s \Delta W_s \quad (6a)$$

Equation (5a) can be rewritten as $$\Delta f_1 = \frac{\Delta W_s}{\eta_1} \quad (5b)$$

Substituting equation (5b) into equation (6a) yields $$\Delta IP_1 = C_o \frac{\Delta W_s}{\eta_1} - C_s \Delta W_s \quad (7a)$$

$$\Delta IP_1 = \left( \frac{C_o}{\eta_1} - C_s \right) \Delta W_s$$

Equation (7a) computes the change in the cost of operation as a function of the change in steam demand if PB1 is dedicated as the swing boiler.

Now consider the same analysis with PB2 as the only boiler allowed to change operating points and PB1 operated as a base loaded unit. For this substitution equations (5) and (6) reduce to $$\Delta W_s = \eta_2 \Delta f_2 \quad (5c)$$

$$\Delta IP_2 = C_o \Delta f_2 - C_s \Delta W_s \quad (6b)$$

As before, equation (5c) can be rewritten as $$\Delta f_2 = \frac{\Delta W_s}{\eta_2} \quad (5d)$$

Substituting equation (5d) into equation (6b) yields $$\Delta IP_2 = C_0 \frac{\Delta W_s}{\eta_1} - C_s \Delta W_s \quad (7b)$$

$$\Delta IP_2 = \left( \frac{C_0}{\eta_2} - C_s \right) \Delta W_s$$

Equation (7b) computes the change in the cost of operation as a function of the change in steam demand in PB2 is used as the only swing boiler.

Now consider the case where the efficiency of PB1 is greater than the efficiency of PB2, that is $$\eta_1 > \eta_2$$

For this situation $$\Delta IP_1 < \Delta IP_2$$

That is, the index of performance for PB1 is lower in value than the index of performance of PB2. More simply stated: Equation (7a) computes to a number smaller in magnitude than does equations (7b). Thus, the incremental change in operating cost for the system will be less if PB1 is the swing boiler.

Thus, for an increase in steam demand, PB1 would take the swing ($\Delta f_2 = 0$) since the incremental cost of increasing steam production is less costly. For a decrease in steam demand, PB2 would take the swing of ($\Delta f_1 = 0$) since the incremental savings of decreasing steam production is larger.

Thus the present invention provides an improved method of integrated control of the power boilers and steam distribution in the pulp and paper industry.

What is claimed is:

1. A method of optimizing the performance of a multi-unit power plant which produces steam energy from a plurality of different fuels where said steam energy used for independent purposes is a significant fraction of the total energy produced by said power plant and where input perturbations to the system affecting its performance cannot be directly and accurately measured said method comprising the following steps: determining by bump tests the read time incremental efficiency of the units of said power plant including the step of sensing a change in the steam energy output of said units in response to a change in fuel input; determining the incremental index of performance of each of said units by utilizing said incremental efficiency determination and the costs of said fuels; and reallocating the energy outputs of said units by changing the fuel inputs in accordance with said indices of performance.

2. A method as in claim 1 where said units include power boilers and in said bump test an incremental change in fuel input is made, the resulting change in output steam is measured, and the ratio is determined as a measure of incremental efficiency.

3. An apparatus for optimizing the performance of a multi-unit power plant, wherein each of said units has an input energy and an output energy, said apparatus comprising: means for changing the amount of input energy of each unit; means for detecting the change of the amount of output energy in response to said change in the input energy of each unit; means for determining an incremental cost for each unit; and means for selecting the unit having the extreme incremental cost in response to a change in the output energy demand and correspondingly changing such unit's input energy.

4. A method of optimizing the performance of a multi-unit power plant, wherein each of said units has an input energy and an output energy, said method comprising: changing the amount of input energy of each unit; detecting the change in the amount of output energy in response to said change in the input energy of each unit; determining an incremental cost of each unit by dividing the cost of the change in input energy by the change in output energy; and selecting the unit with extreme incremental cost in response to a change in the output energy demand and correspondingly changing such unit's input energy.

* * * * *

UNITED STATES PATENT AND TRADEMARK OFFICE
CERTIFICATE OF CORRECTION

PATENT NO. : 4,069,675
DATED : January 24, 1978
INVENTOR(S) : Louis S. Adler et al It is certified that error appears in the above-identified patent and that said Letters Patent are hereby corrected as shown below:

Claim 1, line 9, delete "read" and substitute therefor

--real--

Signed and Sealed this

Sixth Day of June 1978

[SEAL]

Attest:

RUTH C. MASON
Attesting Officer

DONALD W. BANNER
Commissioner of Patents and Trademarks